US009508011B2

(12) United States Patent
Sharon et al.

(10) Patent No.: US 9,508,011 B2
(45) Date of Patent: Nov. 29, 2016

(54) VIDEO VISUAL AND AUDIO QUERY

(75) Inventors: Eitan Sharon, San Mateo, CA (US); Asael Moshe, Sunnyvale, CA (US); Praveen Srinivasan, San Mateo, CA (US); Mehmet Tek, San Mateo, CA (US); Eran Borenstein, Oakland, CA (US); Achi Brandt, San Mateo, CA (US)

(73) Assignee: VIDEOSURF, INC., San Mateo, CA (US)

( * ) Notice: Subject to any disclaimer, the term of this patent is extended or adjusted under 35 U.S.C. 154(b) by 211 days.

(21) Appl. No.: 13/104,793

(22) Filed: May 10, 2011

(65) Prior Publication Data

US 2012/0008821 A1    Jan. 12, 2012

Related U.S. Application Data

(60) Provisional application No. 61/333,093, filed on May 10, 2010, provisional application No. 61/430,445, filed on Jan. 6, 2011.

(51) Int. Cl.
*G06K 9/00* (2006.01)
*G06F 17/30* (2006.01)

(52) U.S. Cl.
CPC ..... *G06K 9/00744* (2013.01); *G06F 17/30784* (2013.01)

(58) Field of Classification Search
USPC .................................. 382/100–119
See application file for complete search history.

(56) References Cited

U.S. PATENT DOCUMENTS

| 4,639,773 | A | | 1/1987 | Hurst | |
| 4,677,466 | A | * | 6/1987 | Lert, Jr. | G06K 9/00711 348/E7.024 |
| 4,739,398 | A | * | 4/1988 | Thomas | G06K 9/00711 382/190 |
| 5,276,790 | A | | 1/1994 | Lo | |
| 5,392,223 | A | | 2/1995 | Caci | |
| 5,410,643 | A | | 4/1995 | Yomdin et al. | |
| 5,473,384 | A | | 12/1995 | Jayant et al. | |
| 5,546,107 | A | * | 8/1996 | Deretsky | G09B 29/106 340/295 |
| 5,574,764 | A | * | 11/1996 | Granfors | H04N 5/2351 348/E5.035 |
| 5,638,135 | A | | 6/1997 | Mukai | |

(Continued)

FOREIGN PATENT DOCUMENTS

| CN | 1199449 C | 4/2005 |
| EP | 1 152 621 | 11/2001 |

(Continued)

OTHER PUBLICATIONS

Sadlier et al - Automatic Tv Advertisement detection from Mpeg bitstream -2002- Center for digital.*

(Continued)

*Primary Examiner* — Chan Park
*Assistant Examiner* — Iman K Kholdebarin
(74) *Attorney, Agent, or Firm* — Aaron Chatterjee; Dan Choi; Micky Minhas

(57) ABSTRACT

A video visual and audio query system for quickly identifying video within a large known corpus of videos being played on any screen or display. In one embodiment, the system can record via a mobile phone camera and microphone a live video clip from the TV and transcode it into a sequence of frame-signatures. The signatures representative of the clips can then be matched against the signatures of the TV content in a corpus across a network to identify the correct TV show or movie.

17 Claims, 5 Drawing Sheets

(56) References Cited

U.S. PATENT DOCUMENTS

| | | | |
|---|---|---|---|
| 5,838,838 A * | 11/1998 | Overton | G06T 3/4023 382/298 |
| 5,886,745 A | 3/1999 | Muraji et al. | |
| 5,923,775 A | 7/1999 | Snyder et al. | |
| 5,982,951 A | 11/1999 | Katayama et al. | |
| 6,208,765 B1 | 3/2001 | Bergen | |
| 6,229,929 B1 | 5/2001 | Lynch et al. | |
| 6,370,543 B2 | 4/2002 | Hoffert et al. | |
| 6,396,948 B1 | 5/2002 | Lynch et al. | |
| 6,400,844 B1 * | 6/2002 | Fan | G06K 9/00456 358/462 |
| 6,404,925 B1 * | 6/2002 | Foote | G06F 17/30746 348/480 |
| 6,442,203 B1 | 8/2002 | Demos | |
| 6,449,608 B1 | 9/2002 | Morita et al. | |
| 6,462,768 B1 | 10/2002 | Oakley | |
| 6,611,296 B1 | 8/2003 | Nieuwenhuizen et al. | |
| 6,643,387 B1 | 11/2003 | Sethuraman et al. | |
| 6,714,929 B1 | 3/2004 | Micaelian et al. | |
| 6,718,365 B1 | 4/2004 | Dutta | |
| 6,741,655 B1 | 5/2004 | Chang et al. | |
| 6,766,037 B1 | 7/2004 | Le et al. | |
| 6,771,793 B1 | 8/2004 | Yamada | |
| 6,774,917 B1 * | 8/2004 | Foote | G06F 17/30814 707/E17.028 |
| 6,792,575 B1 | 9/2004 | Samaniego et al. | |
| 6,850,651 B2 | 2/2005 | Zaklika et al. | |
| 6,891,891 B2 | 5/2005 | Pau et al. | |
| 7,031,555 B2 | 4/2006 | Troyanker | |
| 7,042,527 B2 | 5/2006 | Imai | |
| 7,042,639 B1 | 5/2006 | McDowell | |
| 7,043,078 B2 | 5/2006 | Guleryuz | |
| 7,055,958 B2 * | 6/2006 | Tajima | G06T 3/00 348/E5.137 |
| 7,080,392 B1 | 7/2006 | Geshwind | |
| 7,098,914 B1 | 8/2006 | Katayama et al. | |
| 7,120,195 B2 * | 10/2006 | Patti | G06T 7/2013 348/E5.066 |
| 7,124,365 B2 * | 10/2006 | Cavallerano | H04N 5/44 348/460 |
| 7,136,524 B1 | 11/2006 | Goh et al. | |
| 7,146,361 B2 | 12/2006 | Broder et al. | |
| 7,149,355 B2 | 12/2006 | Kubota | |
| 7,190,832 B2 | 3/2007 | Frost et al. | |
| 7,227,893 B1 | 6/2007 | Srinivasa | |
| 7,246,314 B2 | 7/2007 | Foote et al. | |
| 7,268,939 B1 | 9/2007 | McDowell | |
| 7,274,828 B2 | 9/2007 | Wang et al. | |
| 7,349,922 B2 * | 3/2008 | Brandt | G06F 17/30902 |
| 7,400,680 B2 * | 7/2008 | Jiang | H04N 19/61 375/240 |
| 7,421,455 B2 | 9/2008 | Hua et al. | |
| 7,424,672 B2 * | 9/2008 | Simske | G06K 9/00442 715/243 |
| 7,555,718 B2 | 6/2009 | Girgensohn et al. | |
| 7,589,729 B2 | 9/2009 | Skibak | |
| 7,603,342 B2 * | 10/2009 | Gosse | G06F 17/30864 |
| 7,633,513 B2 | 12/2009 | Kondo et al. | |
| 7,634,147 B2 * | 12/2009 | Neogi | H04N 19/467 382/245 |
| 7,639,258 B1 | 12/2009 | Dowling | |
| 7,650,616 B2 * | 1/2010 | Lee | G06K 9/00523 725/17 |
| 7,782,954 B2 * | 8/2010 | Liang | H04N 19/159 375/240.18 |
| 7,920,748 B2 * | 4/2011 | Sharon | G06K 9/342 382/232 |
| 8,009,897 B2 * | 8/2011 | Xu | G06K 9/32 348/47 |
| 8,018,494 B2 | 9/2011 | Yokomitsu et al. | |
| 8,059,915 B2 * | 11/2011 | Sharon | G06T 7/0085 358/3.26 |
| 8,073,197 B2 | 12/2011 | Xu et al. | |
| 8,134,557 B1 | 3/2012 | Fuchie | |
| 8,139,067 B2 * | 3/2012 | Anguelov | G06T 13/40 345/419 |
| 8,145,656 B2 * | 3/2012 | Shatz | G06F 17/30743 382/103 |
| 8,233,545 B2 * | 7/2012 | Ahuja | G06F 9/30167 375/240 |
| 8,364,660 B2 * | 1/2013 | Delgo | G11B 27/034 707/706 |
| 8,364,698 B2 * | 1/2013 | Delgo | G06F 17/3079 707/769 |
| 8,379,915 B2 * | 2/2013 | Sharon | G06T 7/2006 382/103 |
| 8,385,687 B1 | 2/2013 | Blais-Morin | |
| 8,406,462 B2 * | 3/2013 | Radhakrishnan | G06K 9/00744 382/100 |
| 8,488,839 B2 * | 7/2013 | Sharon | G06T 7/2006 382/103 |
| 8,594,392 B2 * | 11/2013 | Bilobrov | G06K 9/00711 382/124 |
| 8,719,884 B2 * | 5/2014 | Sharon | H04H 60/59 725/115 |
| 2001/0049826 A1 | 12/2001 | Wilf | |
| 2002/0003900 A1 | 1/2002 | Kondo | |
| 2002/0114394 A1 | 8/2002 | Ma | |
| 2003/0088554 A1 | 5/2003 | Ryan et al. | |
| 2003/0097301 A1 | 5/2003 | Kageyama et al. | |
| 2003/0120652 A1 | 6/2003 | Tifft | |
| 2003/0152277 A1 * | 8/2003 | Hall, Jr. | G06K 9/033 382/229 |
| 2003/0234803 A1 | 12/2003 | Toyama et al. | |
| 2004/0013305 A1 * | 1/2004 | Brandt | G06F 17/30902 382/224 |
| 2004/0081239 A1 * | 4/2004 | Patti | G06T 7/2013 375/240.16 |
| 2004/0125877 A1 * | 7/2004 | Chang | G06F 17/30787 375/240.28 |
| 2004/0240725 A1 * | 12/2004 | Xu | G06K 9/32 382/154 |
| 2005/0050023 A1 * | 3/2005 | Gosse | G06F 17/30864 |
| 2005/0069037 A1 * | 3/2005 | Jiang | H04N 19/61 375/240.16 |
| 2005/0179814 A1 | 8/2005 | Pau et al. | |
| 2005/0216851 A1 | 9/2005 | Hull et al. | |
| 2005/0275626 A1 | 12/2005 | Mueller et al. | |
| 2005/0276475 A1 | 12/2005 | Sawada | |
| 2006/0059120 A1 * | 3/2006 | Xiong | G06F 17/30787 |
| 2006/0075237 A1 * | 4/2006 | Seo | G06K 9/00523 713/176 |
| 2006/0122839 A1 * | 6/2006 | Li-Chun Wang | G06F 17/30743 704/273 |
| 2006/0122997 A1 | 6/2006 | Lin | |
| 2006/0195861 A1 * | 8/2006 | Lee | G06K 9/00523 725/19 |
| 2006/0291567 A1 | 12/2006 | Filippini et al. | |
| 2007/0070226 A1 * | 3/2007 | Matusik | H04N 5/272 348/275 |
| 2007/0078832 A1 | 4/2007 | Ott, IV et al. | |
| 2007/0080965 A1 | 4/2007 | Kondo | |
| 2007/0106952 A1 * | 5/2007 | Matas | G06F 17/30905 715/764 |
| 2007/0110333 A1 | 5/2007 | Kondo | |
| 2007/0116365 A1 | 5/2007 | Kloer | |
| 2007/0157239 A1 | 7/2007 | Wang et al. | |
| 2007/0185858 A1 | 8/2007 | Lu et al. | |
| 2007/0203942 A1 | 8/2007 | Hua et al. | |
| 2007/0216687 A1 | 9/2007 | Kaasila | |
| 2008/0021710 A1 | 1/2008 | Ho | |
| 2008/0080743 A1 | 4/2008 | Schneiderman et al. | |
| 2008/0086688 A1 | 4/2008 | Chandratillake et al. | |
| 2008/0101656 A1 | 5/2008 | Barnes | |
| 2008/0118107 A1 * | 5/2008 | Sharon | G06T 7/2006 382/103 |
| 2008/0118108 A1 | 5/2008 | Sharon et al. | |
| 2008/0120290 A1 * | 5/2008 | Delgo | G06F 17/30997 |
| 2008/0120291 A1 * | 5/2008 | Delgo | G06F 17/3082 |
| 2008/0120328 A1 * | 5/2008 | Delgo | G06F 17/3079 |
| 2008/0154889 A1 | 6/2008 | Pfeiffer | |
| 2008/0159622 A1 | 7/2008 | Agnihotri et al. | |
| 2008/0159630 A1 | 7/2008 | Sharon et al. | |

(56) References Cited

U.S. PATENT DOCUMENTS

| | | | |
|---|---|---|---|
| 2008/0193017 A1 | 8/2008 | Wilson et al. | |
| 2008/0292187 A1 | 11/2008 | Eitan et al. | |
| 2008/0292188 A1 | 11/2008 | Ettan et al. | |
| 2009/0060277 A1 | 3/2009 | Zhang | |
| 2009/0074235 A1* | 3/2009 | Lahr | G06F 17/30799 382/100 |
| 2009/0083228 A1* | 3/2009 | Shatz | G06F 17/30743 |
| 2009/0141940 A1 | 6/2009 | Zhao et al. | |
| 2009/0263023 A1* | 10/2009 | Iwamoto | G06T 7/2033 382/199 |
| 2009/0271398 A1* | 10/2009 | Scherf | G06F 17/30817 |
| 2009/0290020 A1 | 11/2009 | McLeish | |
| 2010/0034467 A1* | 2/2010 | Yu | G06T 7/004 382/206 |
| 2010/0049711 A1* | 2/2010 | Singh | G06F 17/30781 707/758 |
| 2010/0057694 A1 | 3/2010 | Kunjithapatham et al. | |
| 2010/0061590 A1* | 3/2010 | Neogi | H04N 19/467 382/100 |
| 2010/0070483 A1 | 3/2010 | Delgo et al. | |
| 2010/0070523 A1 | 3/2010 | Delgo et al. | |
| 2010/0082585 A1 | 4/2010 | Barsook et al. | |
| 2010/0095320 A1* | 4/2010 | Lee | G06K 9/00523 725/19 |
| 2010/0104261 A1 | 4/2010 | Liu et al. | |
| 2010/0205203 A1 | 8/2010 | Anderson et al. | |
| 2010/0265354 A1 | 10/2010 | Kameyama | |
| 2011/0043652 A1* | 2/2011 | King | G06F 17/2211 348/222.1 |
| 2011/0169976 A1* | 7/2011 | Carter | H04N 21/4126 348/222.1 |
| 2011/0246402 A1* | 10/2011 | Burman | G08B 13/1672 706/14 |
| 2011/0249867 A1* | 10/2011 | Haas | G06K 9/00818 382/103 |
| 2011/0274353 A1* | 11/2011 | Yu | G06K 9/00664 382/173 |
| 2012/0008821 A1* | 1/2012 | Sharon | G06K 9/00744 382/100 |
| 2012/0207404 A1* | 8/2012 | Robles-Kelly | G06K 9/4661 382/286 |
| 2013/0014016 A1* | 1/2013 | Delgo | G06F 17/3079 715/723 |
| 2013/0016897 A1* | 1/2013 | Cho | H04N 13/0011 382/154 |
| 2013/0083003 A1* | 4/2013 | Perez | G06F 3/005 345/419 |
| 2013/0215116 A1* | 8/2013 | Siddique | G06Q 30/0643 345/420 |
| 2013/0326573 A1* | 12/2013 | Sharon | H04H 60/59 725/115 |

FOREIGN PATENT DOCUMENTS

| | | |
|---|---|---|
| EP | 1 732 329 | 12/2006 |
| JP | 6-105211 | 4/1994 |

OTHER PUBLICATIONS

Rosten et al - Robust feature matching in 2.3 ms -2009, Department of Eng. Univ. Of Cambridge, Uk.*

Sadlier et al - Automatic TV advertisement detection from MPEG bitstream, intl Conf on Enterprise information system, setubal, Portual, 7-10 Jul 2001.*

Lepetit et al. Randomized trees for real-time key point recognition, 2005, 18th IEEE conference on computer vision and pattern recognition).*

Office Action dated Jul. 19, 2012, in U.S. Appl. No. 11/687,341, filed Mar. 16, 2007.

Amendment dated May 30, 2012, in U.S. Appl. No. 11/687,341, filed Mar. 16, 2007.

Amendment dated Feb. 28, 2011, in U.S. Appl. No. 11/687,341, filed Mar. 16, 2007.

Notice of Allowance dated Jul. 11, 2012, in U.S. Appl. No. 12/502,202, filed Jul. 13, 2009.

Amendment dated May 23, 2012, in U.S. Appl. No. 12/502,202, filed Jul. 13, 2009.

Office Action dated Nov. 23, 2011, in U.S. Appl. No. 12/502,202, filed Jul. 13, 2009.

Amendment dated Sep. 23, 2011, in U.S. Appl. No. 12/502,202, filed Jul. 13, 2009.

Notice of Allowance dated Aug. 17, 2012, in U.S. Appl. No. 12/502,206, filed Jul. 13, 2009.

Amendment dated May 21, 2012, in U.S. Appl. No. 12/502,206, filed Jul. 13, 2009.

Office Action dated Nov. 21, 2012, in U.S. Appl. No. 12/502,206, filed Jul. 13, 2009.

Amendment dated Sep. 29, 2011, in U.S. Appl. No. 12/502,206, filed Jul. 13, 2009.

Amendment dated May 30, 2012, in U.S. Appl. No. 11/687,261, filed Mar. 16, 2007.

Amendment dated Feb. 28, 2011, in U.S. Appl. No. 11/687,261, filed Mar. 16, 2007.

Notice of Allowance dated Sep. 24, 2012, in U.S. Appl. No. 11/687,261, filed Mar. 16, 2007.

Notice of Allowance dated Sep. 24, 2012, in U.S. Appl. No. 12/502,202, filed Jul. 13, 2009.

Notice of Allowance dated Sep. 27, 2012, in U.S. Appl. No. 12/502,206, filed Jul. 13, 2009.

U.S. Appl. No. 13/619,550, filed Sep. 14, 2012.

Preliminary Amendment dated Dec. 28, 2012, in U.S. Appl. No. 13/619,550, filed Sep. 14, 2012.

Notice of Allowance dated Mar. 15, 2013, in U.S. Appl. No. 11/687,341, filed Mar. 16, 2007.

Amendment dated Jan. 18, 2013, in U.S. Appl. No. 11/687,341, filed Mar. 16, 2007.

International Search Report and Written Opinion issued for PCT/US2007/024197; dated May 19, 2008; 4 pages.

International Preliminary Report on Patentability and Written Opinion dated Jun. 4, 2009 directed at related application No. PCT/US2007/024198; 10 pages.

International Search Report and Written Opinion issued for PCT/US2007/024199; dated May 22, 2008; 5 pages.

International Search Report mailed on Sep. 22, 2008 directed at counterpart application No. PCT/US2008/64683;1 page.

International Search Report mailed on Aug. 24, 2009 directed to international application No. PCT/US2009/50409; 11 pages.

"Object Classification by Statistics of Multi-scale Edges Based on BD Integrals," Anonymous CVPR submission, Paper ID 1413, 1-6. Nov. 15, 2009.

Aji, et al. (2000). "The Generalized Distributive Law", *IEEE Transactions on Information Theory* 46(2):325-343.

Bhattacharyya. (1943)."On a measure of divergence between two statistical populations defined by their probability distributions", *Bulletin of the Calcutta Mathematical Society* 35: 99-109. MR0010358.

Borenstein et al., "Combining Top-Down and Bottom-up Segmentation," Proceedings IEEE Workshop on Perceptual Organization in Computer Vision, 2004 Conference on Computer Vision and Pattern Recognition Workshop, Washington, DC. 27-02 Jun. 2004, 1-8.

Bourke, Intersection Point of Two Lines (2 Dimensions), http://local.wasp.uwa.edu.au/~pbourke/geometry/lineline2d/, (Apr. 1989), 1-2.

Brandt et al. "Fast Calculation of Multiple Line Integrals;" SIAM J. Sci. Comput., 1999, 1417-1429, vol. 20(4).

Cai et al., "Mining Association Rules with Weighted Items, " Database Engineering and Applications Symposium, 1998. Proceedings. IDEAS'98. International, Jul. 8-10, 1998, 68-77.

Corso et al., "Multilevel Segmentation and Integrated Bayesian Model Classification with an Application to Brain Tumor Segmentation," Medical Image Computing and Computer-Assisted Intervention (MICCAI), 2006, Appeared in Springer's "Lecture Notes in Computer Science."

(56) References Cited

OTHER PUBLICATIONS

Galun et al., "Texture Segmentation by Multiscale Aggregation of Filter Responses and Shape Elements," Proceedings IEEE International Conference on Computer Vision, 716-723, Nice, France, 2003.
Gorelick et al., "Shape Representation and Classification Using the Poisson Equation," IEEE Transactions on Pattern Analysis and Machine Intelligence, Dec. 2006, 1991-2005, vol. 28(12).
Gorelick et al., "Shape Representation and Classification Using the Poisson Equation," IEEE Conference on Computer Vision and Pattern Recognition, Washington, DC, Jun. 2004.
Lee et al., "A Motion Adaptive De-interfacing Method Using an Efficient Spatial and Temporal Interpolation," IEEE Transactions on Consumer Electronics, 2003, 1266-1271, vol. 49(4).
Lindley, "Creation of an MPEG-7 Feature Extraction Plugin for the platform METIS," Universitat Wien/ TU Wien, 2006, Betreuer: R. King, W. Klas.
Lowe, (Sep. 1999) "Object recognition from local scale-invariant features". Proc. of International Conference on Computer Vision, Corfu. 8 pages.
Lucas et al., "An Iterative Image Registration Technique with an Application to Stereo Vision," Proceedings of Imaging Understanding Workshop, 1981, 121-129.
Mikolajczyk et al., (Oct. 2005). "A performance evaluation of local descriptors". IEEE Computer Society. IEEE Transactions on Pattern Analysis and Machine Intelligence. 27(10): 1615-1630.
Ng et al., "On Spectral Clustering: Analysis and an algorithm," 2001. http://citeseerx.ist.psu.edu/viewdoc/summary?doi=10.1.1.19.8100.
Okuma et al., A boosted particle filter: Multi-target detection and tracking, ECCV, 2004. http://www.springerlink.com/content/wyf1nw3xw53xjnf3/.
Polimeni, "Space-time Adaptive Image Representations: Data Structures, Hardware and Algorithms," located at <http://eslab.bu.edu/publications/proceedings/2001/polimeni100'spacetime.pdf> visited on Aug. 13, 2009. (23 pages).
Rabiner "A tutorial on Hidden Markov Models and selected applications in speech recognition". (Feb. 1989).
Sharon et al., (Oct. 2000) "Completion Energies and Scale," IEEE Transactions on Pattern Analysis and Machine Intelligence. 22(10):1117-1131.
Sharon et al., "Fast Multiscale Image Segmentation," Proceedings IEEE Conference on Computer Vision and Pattern Recognition, 1:70-77, South Carolina, 2000.
Sharon et al., "2D-Shape Analysis using Conformal Mapping," Division of Applied Mathematics, Brown University, 1-31. 2005.
Sharon et al., "2D-Shape analysis using Conformal Mapping," Proceedings IEEE Conference on Computer Vision and Pattern Recognition, Washington, DC, 2004. 1-8.
Sharon et al., "Completion Energies and Scale," Proceedings IEEE Conference on Computer Vision and Pattern Recognition, 1997, 884-890, Puerto Rico.
Sharon et al., "Hierarchy and Adaptivity in Segmenting Visual Scenes," Nature, Jun. 28, 2006, online; Aug. 17 print, 1-4.
Sharon et al., "Segmentation and Boundary Detection Using Multiscale Intensity Measurements," Proceedings IEEE Conference on Computer Vision and Pattern Recognition, I: 469-476, Kauai, Hawaii, 2001.
Shi et al., "Good Features to Track, " 1994 IEEE Conference on Computer Vision and Pattern Recognition (CVPR'94), 1994, 593-600.
Viola et al., "Rapid object detection using a boosted cascacd of simple features," Proc. Computer Vision and Pattern Recognition, 2001.
Tao et al., "Weighted Association Rule Mining using Weighted Support and Significance Framework," In: The Ninth ACM SIGKDD International Conference on Knowledge Discovery and Data Mining(ACM SIGKDD 2003), Aug. 24-27, 2003, Washington, DC, USA.
Delgo et al., U.S. Office Action mailed on Dec. 29, 2008 directed at U.S. Appl. No. 11/687,300; 52 pages.
Delgo et al., U.S. Office Action mailed on Aug. 27, 2009 directed at U.S. Appl. No. 11/687,300; 56 pages.
Delgo et al., U.S. Office Action mailed on Dec. 22, 2008 directed at U.S. Appl. No. 11/687,290; 57 pages.
Delgo et al., U.S. Office Action mailed on Jul. 8, 2009 directed at U.S. Appl. No. 11/687,290; 52 pages.
Delgo et al., U.S. Office Action mailed on Dec. 29, 2008 directed at U.S. Appl. No. 11/687,326; 54 pages.
Delgo et al., U.S. Office Action mailed on Aug. 27, 2009, directed to U.S. Appl. No. 11/687,326; 58 pages.
Sharon et al., U.S. Office Action mailed Aug. 26, 2010, directed to U.S. Appl. No. 11/687,261; 25 pages.
Sharon et al., U.S. Office Action mailed Mar. 23, 2011, directed to U.S. Appl. No. 11/687,261; 12 pages.
Sharon et al., U.S. Office Action mailed Aug. 26, 2010, directed to U.S. Appl. No. 11/687,341; 28 pages.
Sharon et al., U.S. Office Action mailed Mar. 23, 2011, directed to U.S. Appl. No. 11/687,341; 14 pages.
Sharon et al., U.S. Office Action mailed Mar. 8, 2011, directed to U.S. Appl. No. 11/984,670; 6 pages.
Sharon et al., U.S. Office Action mailed on Jul. 9, 2010, directed at U.S. Appl. No. 11/802,498; 8 pages.
Delgo et al., U.S. Office Action mailed Mar. 23, 2011, directed to U.S. Appl. No. 12/502,202; 42 pages.
Delgo et al., U.S. Office Action mailed Mar. 29, 2011, directed to U.S. Appl. No. 12/502,206; 17 pages.
Office Action dated Oct. 3, 2013, in U.S. Appl. No. 13/619,550, filed Sep. 14, 2012.
Response to Office Action dated Apr. 3, 2014, U.S. Appl. No. 13/619,550, filed Sep. 14, 2012.
Office Action dated Jun. 12, 2014, U.S. Appl. No. 13/619,550, filed Sep. 14, 2012.
U.S. Appl. No. 14/306,942, filed Jun. 17, 2014.
Office Action dated Aug. 13, 2015 in U.S. Appl. No. 14/260,171.
Office Action dated Sep. 30, 2015 in U.S. Appl. No. 14/306,942.
Response to Office Action filed Nov. 12, 2015 in U.S. Appl. No. 14/260,171.
Notice of Allowance and Fee(s) Due dated Dec. 9, 2015 in U.S. Appl. No. 14/260,171.
Response to Office Action filed Dec. 16, 2015 in U.S. Appl. No. 14/306,942.

\* cited by examiner

VIDEO VISUAL AND AUDIO QUERY

CROSS REFERENCE TO RELATED APPLICATIONS

This application claims the benefit of U.S. Provisional Application No. 61/333,093, filed May 10, 2010, and U.S. Provisional Application No. 61/430,445, filed Jan. 6, 2011, the entireties of which are incorporated herein by reference.

FIELD OF THE INVENTION

This relates to using content to search content, including capturing a clip of video and/or audio being played on a screen and using the captured clip to query and quickly identify the video.

BACKGROUND

Various searching methods and systems are directed to identifying and retrieving content based on key words found in an associated file name, tags on associated web pages, text of hyperlinks pointing to the content, etc. Such search methods rely on Boolean operators indicative of the presence or absence of search terms. However, such search terms tend not to fully represent the content being searched, leading to poor performance when searching content such as video or audio.

SUMMARY

A video visual and audio query system is disclosed for quickly identifying any video within a large known corpus of videos being played on any screen or display, such as a TV panel. The screen on which the video is playing can be either stationary or moving itself.

In one embodiment, the system can record via a mobile phone camera and microphone a live video clip from the TV and transcode it into a sequence of frame-signatures. The signatures representative of the clips can then be matched against the signatures of the TV content in a corpus across a network to identify the correct TV show or movie. Live TV content in such an embodiment can be immediately and continuously transcended into frame signatures for injecting into the ground-truth corpus for the video visual and audio query, which refers to the query clip to be matched against the corpus. The identified show can be then featured for instance upon availability as an online video through suitable video search functionality, or be posted for social interaction as an example, alongside any information about the particular people or other objects visually identified in the show to having appeared on screen.

Figure 1:
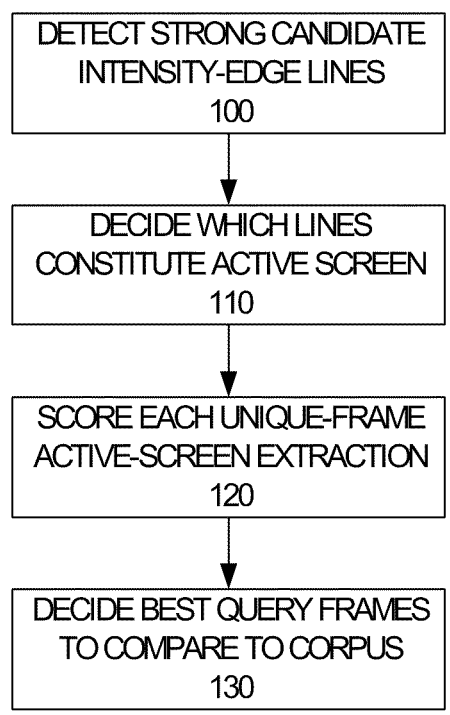
FIG. 1 illustrates an example of a screen detection and extraction process in accordance with one embodiment.

DETAILED DESCRIPTION 2010 was the year that mobile devices appeared to break through. Almost overnight it appeared that everyone had a 3G or better device, touch capable and camera equipped with them at all times. Tactile, intuitive interfaces are quickly taking a big chunk of consumer attention previously limited to websites, and many publishers are going "mobile first" investing most if not all of their attention in mobile apps. Mobile is not just about phones any more—for example, between their different iOS® devices Apple, Inc. is out-selling OS X computers many times, and many expect similar application-based solutions on other connected devices in the near future. Further, video has become central to mobile carriers' strategy as they deploy 4G networks, with large screen phones, tablets and other connected devices allowing ubiquitous access to more and more of the media out there—either for viewing on the device or for projecting onto any one of the screens at home.

Embodiments of the invention provide a system that allows any video in the world can be searchable, playable in a tactile player that allows a user flip through videos, click on people or objects in the video to learn more about them, find recommendations for more videos to watch, see what their friends had to say about these videos or what is buzzing around the web. With this system a user's mobile device can be the perfect companion for every video the user watches on TV by instantly recognizing what the user watches and allowing the user interact with the content, learn more about the people and objects on the screen, recommend entire shows or specific scenes directly to the user's friends and more. In addition to allowing users to find and view videos to watch, interact with them and share them directly and instantly with friends, the system can also allow publishers and advertisers tailor custom, interactive companion experiences to premium content on TV and on the web creating a rich, monetizeable marketplace.

The system can implement a video visual and audio query system to quickly identify any video within a large known corpus of videos being played on any screen (e.g., a TV panel). The screen on which the video is playing can be either stationary or moving itself. In one embodiment, the system can record via a mobile phone camera and microphone a live video clip from the TV and transcode it into a sequence of frame-signatures. The signatures representative of the clips can then be matched against the signatures of the TV content in a corpus across a network to identify the correct TV show. Live TV content in such an embodiment can be immediately and continuously transcended into frame signatures for injecting into the ground-truth corpus for the video visual and audio query, which refers to the query clip to be matched against the corpus. The identified show can be then featured for instance upon availability as an online video through suitable video search functionality, or be posted for social interaction as an example, alongside any information about the particular people or other objects visually identified in the show to having appeared on screen.

A. Visual and Audio Query, Signatures Search and Video ID Results

1. Embodiments of the invention include a 'signature search' methodology leading to the video identification:
   a. Preparing the query-frames for the visual query: identifying screen boundaries and selecting representative frames: The clips frames can be processed for extracting the active video screen in each (e.g., see section B below), over which the signatures can be computed (e.g., see section C below). Then a confidence score computed for the goodness-of-screen-extraction can be used in conjunction with the statistical nature of the signature (e.g., the signature being a non-degenerate) in order to line up a few signatures from the clip in the order by which they are to be compared to the signature corpus of the ground-truth videos for identifying the correct frames/video.
   b. Preparing the query-frames for the audio query: identifying the correct temporal alignment and selecting representative frames: the system can divide the video's audio stream into consecutive temporal segments such as segments made of 4 seconds each (e.g., see section D below). Each of which can then be translated into an averaged-spectrogram image that the system can associate with its particular video frame location (e.g., the video frame located at its beginning). The system can then extract visual signatures from each such averaged-spectrogram image, for representing the video frame associated with it, similarly to how the system does it on the visual query side (e.g., as described in section 1.a. above, and in more detail in section C below).
   c. Searching the corpus using the query-frames: The correct hits/videos are the among the ones which repeat as a multiple video result for a majority of the query-clips frame signatures compared each against the entire ground-truth corpus of signatures.
      i. In matching each query-clip frame signature to the entire corpus of signatures the system can tune 'a match' so as to find the correct same frame with a probability higher than a certain percentage such as 96% (see example below in section C), as well as match a few false positives. This can be done for efficiency reasons. When the system aggregates the matches for a few query frames the system can filter out the false positives while keeping the correct video hits.
2. Embodiments of the invention further include collecting signatures for the corpus: Indexing the ground truth corpus of video frames in preparation for a fast signature-matching search as described in the examples of sections C and D below.
3. Embodiments of the invention further include building an index for searching efficiently: the system can organize the signatures into multiple layers: e.g., a first, for very fast matching, can include up to a first amount, such as 50M, of frame signatures and a second, for a slower but more comprehensive search, can store the other signatures. A concrete example of a frame signature consisting of a 128 bit array and signatures similarity based on ordinal measures is provided in section C below. Using these two layers, the search can proceed in a coarse to fine manner:
   a. First layer (direct match, no indexing): the system can keep in the fast, active memory (and cache) up to the first amount (e.g., 50 million) of ground-truth frame signatures to match with a query-clip using direct comparisons between the query signature and the corpus signatures. The number of identical bits can determine the similarity ('bit-count similarity', or accordingly the number of different bits is the 'bit-count (hamming) distance') between each two signatures, and hence between the respective frames they represent. The system can employ such a first layer of direct bit-count matches to cover a relatively small portion of the signature corpus (e.g., the 50 million signatures mentioned above, standing for about 500 video hours) which does not yet require the 'bit-window indexing' as described in the example in section C below. It should be noted that this number can be increased without compromising performance by parallelizing such direct-memory bit-count matches on various different machines.
   b. Second-layer (searching a pre-made index): in case that the query clips cannot find a good match with clips in the first layer, then the system can proceed to the second layer of searching through a pre-indexed signature corpus (e.g., using the bit-window method described in section C). This second layer is not required to be stored in memory and can include many more signatures than the first amount. Instead, it is loaded up to memory in parts, according to the query bit-window signature values as described in the example in section C. Upon loading the candidate signatures to the memory a direct bit-count match can be employed again, just like for the first layer.
4. Embodiments of the invention further include selecting a few query frames (and their respective signatures) from the visual query clip according to their goodness-of-screen-extraction and their goodness-of-signature (both as described in B below), and trying multiple time-shifted averaged-spectrogram frames (and their respective signatures) from the audio query to account for multiple possible temporal alignments, in order to be used for the signature search against the entire ground truth signature corpus (and frames/videos).

B. Screen Detection and Extraction

As depicted in FIG. 1, the system can process the visual-query clips to detect the active video-play screen area ("active screen"), over which the frame-signatures can subsequently be computed to allow the indexing and search of the content. Some measurements used for the extraction of the active screen recorded in the visual query clip are listed and described below, after which a screen extraction workflow is outlined:

1. Fast detection (block 100) for each video frame of all various straight intensity-transition lines ("intensity-edges") of suitable lengths, locations and orientations which are valid candidates for being the four edges outlining the recorded active screen. Further, since many phones have an orientation detector, the system can require that the line-integral orientations be determined relative to the phone orientation.
2. Calculating the average color (intensity) over each of the two-side lines of the candidate intensity-edges (the lines whose averages-intensity difference is the magnitude of the edge in their direction and orientation).
3. Calculating the intensity distribution along each of the two-side lines of the candidate intensity-edges (the lines whose averages-intensity difference is the magnitude of the edge in their direction and orientation), and determining the "line-support" of the average intensity along each of those lines—that is, which line parts does the majority of the average intensity is coming from. Thus determining the line support for the entire intensity-edge response as well.

4. Analyzing the intensity distribution along each of the two-side lines of the candidate intensity-edges, and determining the variance of the intensities along each of the lines, as well as the "line-support" of this intensity-variance along each of those lines (which line parts does the majority of the intensity-variance coming from). Thus determining the line support for the intensity-variance differences between the two-side lines along each intensity-edge as well.

5. Analyzing each of the candidate intensity-edges lines for determining the extent to which each such line may be crossing through a continuous substantial image object (having an intensity which is significantly greater than zero: meaning that this part of the image is not totally in the dark). Then scoring lower these lines which are crossing substantial object with respect to their probability of being the correct edges (block 110) of the active video screen. One technique for scoring the lines can be judging whether they are crossing some continuous image segments.

Blocks B.1-B.5 can implement suitable algorithms for fast multiscale calculation of line edges and line intensity variances, such as those disclosed in U.S. patent application Ser. No. 11/984,670, filed Nov. 20, 2007, which is incorporated herein by reference in its entirety.

6. Sorting out a few potential sets of four edges each representing a different hypothesis for the whereabouts of the active video screen (bounded by its edges). Each screen hypothesis can be scored (block 120) for its "goodness" according to various screen considerations (e.g., the screen hypothesis fitting better to a guiding inner frame presented to the recording person on the mobile-camera side for visual feedback and more stable screen capture; and/or screen hypothesis with more likely aspect ratios).

7. Local aggregation and optimization across small time segments, "sawing-up" together matching consecutive such screen hypothesis (sets of four edges each) for getting a more-global aggregated scoring of the goodness of each of the screen hypothesis participating, and correcting this way potential local (in time) screen-detection scoring errors. To get rid of any remaining screen-detection outliers (errors in detection for some of the frames), the system can employ a global set of equations, to be satisfied simultaneously by all of the screen-detection hypotheses, under which every single screen detection needs be well predicted by the average of the detections of its temporal frame neighbors.

8. Motion analysis between consecutive video frames using optical-flow methods, mostly applied to the image peripheries (hence avoiding relying on the intensities of the ever changing video content within the recorded active screen), and injecting the detected motion parameters into the local screen-hypothesis optimization and the goodness-of-screen scoring as explained in points B.6 and B.7 above.

9. Providing the video identification signature-search part (e.g., see section C below) with a set of ordered best frame signatures (block 130) to search for in the entire video corpus (for identifying this video content) using the final scoring of each of the clips frames with respect to the certainty that the correct active video screen was detected (using goodness-of-screen considerations similar to what's being used in B.6 above).

10. Using local frame differences between consecutive video frames (generated by motion within the recorded video) as an important signal for detecting the active video screen according to all the considerations outlined above.

An embodiment of a screen-extraction outline implemented by the system: detect the strong candidate intensity-edge lines. Out of all the candidate lines look for lines with edges in which the more inwards of the two-side edge lines has a significant (even if small) well-spread intensity variance along the line, and where the more external line has a rather insignificant (even if existing) well-spread spatial intensity variance along the line. For further filtering of candidate lines the system can get rid of lines that cut through any continuous object, as these are suspect to be mid-screen. On top of the line candidates come the active screen structure considerations for deciding which are the four lines that constitute the active screen: for this the system can prefer the more inwards lines amongst all lines that are located around 10% inwards from the inclusive recording full screen of the camera (this is where the guiding frame of the recording application suggests that the user overlays the active video screen on; see B.6 above), as well as a more trustable active screen aspect ratio. The system can then use local optimization considerations across time for scoring and fixing each unique-frame active-screen extraction (see points B.6-8), following which the system can decide which query frames are the ones best being compared (signatures-wise) to the entire video corpus for identifying the clip—the consideration being frames for which the active screen extracted and the signature computed are statistically most trustable.

C. Video ID Frame Signatures and Indexing

Figure 2:
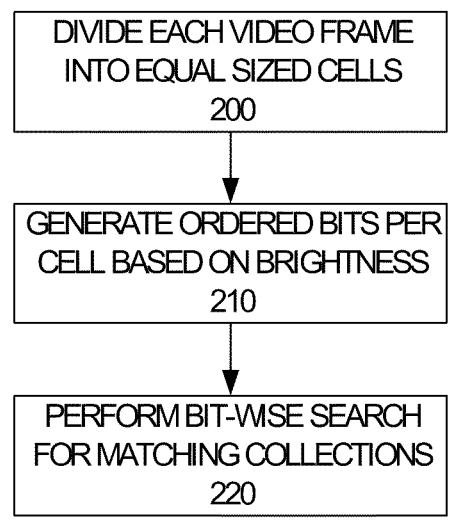
FIG. 2 illustrates an example of a video signature process in accordance with one embodiment.
Figure 3:
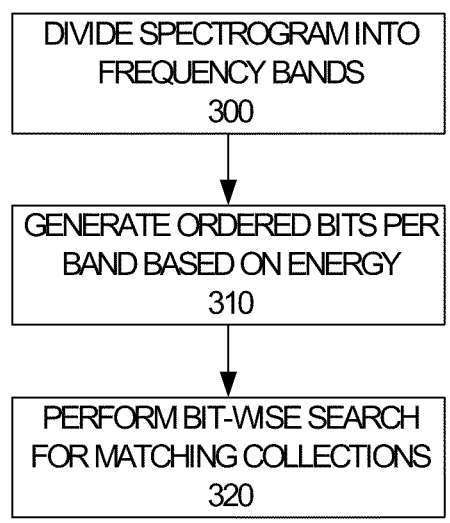
FIG. 3 illustrates an example of an audio signature process in accordance with one embodiment.

The system can extract signatures from video frames, to be directly compared in order to match video frames between a large corpus of "ground-truth" videos and frames in the query clips. As depicted in FIG. 2, the properties of the signature include that it allows for the matching to overcome distortions in the clip frames which are generated by the inherent lower quality of the mobile camera video clip (most-likely a lower-end camera) recording a "second-hand-video" from the playing active video screen (e.g. distortions such as saturation and aliasing and other sampling effects). The system can also index those signatures for the purpose of searching through swiftly for finding any potentially or partially matching particular signature (or a small set of signatures).

1. The system can divide (block 200) each video frame (image) into 64 (8×8) equal size rectangular ordered cells.

2. In each cell the system can generate (block 210) two ordered bits. For example:
  a. 1st bit=1 if the right half of the cell is brighter than the left half, and =0 if it's darker.
  b. 2nd bit=1 if the upper half of the cell is brighter than the lower half, and =0 if it's darker.

3. Thus the system has an ordered list of 128 bits per frame, coming from its 64 ordered cells.
  a. As a note: similar and other related signatures can be employed, which may be more robust with respect to low-quality videos, low-quality cellular-phone camera recordings, bad lighting conditions and imperfections of the active screen extraction (the exact delineation of the original video playing). One simple example includes dividing the active screen to larger 6×6=36 equal size rectangular cells, then producing a larger signature of, for example, say 196 bits (rather than the 128 described above) by way of comparing many different pairs of cells with respect to which is brighter than the other and producing the respective bits (similar to what is explained above for the 128-bit signature).

4. Random 5-bit sets and 16 collections of 5-bit sets:
Experiments show that the matching of the 128 bits between a ground-truth frame and a mobile-query same-frame (saturated intensities etc) is identical in about 80% random bits, whereas a random match would merely be 50% identical bits.
  a. There are 2"5=32 values that each randomly selected set of 5 bits may undertake—so that each such 5-bit set divides the frame corpus into 32.
  b. If any random collection of 16 such random 5-bit sets is taken, its values can randomly indicate about half of the frames in the corpus (16×1/32).
  c. Thus if the system applies 20 times a random selection of such 16 5-bit sets and intersects all the frames between the 20 times the system should obtain roughly (at most) $0.5^{20}$ different frames which is about 1/1,000,000 (1 million-th) of the entire corpus of frames. Actually since some frames will happen to match the query frame in more than just 1 of the 16 5-bit sets, the system is getting less than 0.5 the corpus of frames for each 16 5-bit set (i.e., the # frames that will not match any of the 16 5-bit sets is $(31/32)^{16}$, and hence # of diff frames that match one of the 16 5-bit sets is approx. $(1-(31/32)^{16})=0.4$; a better bound than 0.5 so that instead of 1/1.000,000 we actually get 1/10,000,000).
  d. The probability of a random particular 5-bit set to match between the same ground-truth and a mobile-query frame is thus $0.8^5$.
  e. The probability thus of a random collection of 16 such 5-bits frames to all not match (no single 5-bit string matches in values) if same-frames is equal to $(1-0.8^5)^{16}=0.00174$.
5. For every mobile-query frame
  a. The system can randomly pick 16 collections of 5-bit sets, times 20 (all 20×16 5-bit sets are prefixed in location for all frames). Please note that this set is a fixed set, otherwise one cannot keep the lists mentioned in C.6.a.
  b. The system can search (block 220) all the frames in the ground-truth corpus that have at least of the 16 5-bit sets with the exact same values as the query frame.
  c. The system can repeat that 20 times (for 20 different collections of 16 5-bits) and keep only those frames which appeared in all 20 times—that is appear in the intersection of all collections of frames retrieved for each 16 5-bit set case.
  d. The system can thus obtain about a 1-10 million-th (1/10,000,000) of the entire frame corpus for which the probability that the query frames (if exists) is included is: $(1-0.00174)^{20}=0.965$.
    i. As for the probability of false positives: For matching pair: Probability that 5 bit set matches=P5_match=$0.8^5$=0.328, probability that at least one match in the 16 bit collection=P16_true=$1-(1-P5\_match)^{16}=1-0.00174=0.998$, probability that all 20 trials of 16 bit collections=P20_true=$P16\_true^{20}$=0.966. Compare the above with non-matching, random pair: Probability that 5 bit set matches=P5_random=$0.5^5$=1/32, probability that at least one match in the 16 bit collection=P16_random=$1-(31/32)^{16}=1-0.6=0.4$, probability that all 20 trials of 16 bit collections=P20_random=$1.0^{-8}$. The probability for false alarm for one comparison is therefore P20_random. However, if the query is matched with n-frames, the probability of at least one false alarm is becoming: $1-(1-P20\_random)^n$. When n is sufficiently large, this is about: $1-\exp(-P20\_random*n)$. Therefore, when n=1/P20_random~=100M frames we will have at least one false alarm in probability $1-1/e$~=0.632
6. Exercising this method the system can:
  a. Keep a list of frames for each of the 32 values ($2^5$) of each of the 20×16 different 5-bit sets
  b. Keep overall 32×16×20 lists covering all of the frames
  c. Every frame belongs to 320 (16×20) lists of frames
7. The system can index (assign the 320 lists to each ground-truth frame) separately different bulks of TV times (last few minutes, last couple of hours, last half a day, last day, etc.) and incrementally match the query-frame 16 5 bit sets against all.
8. The system can search for a few mobile-query random frames first and then for more as needed in order to overcome false-positive matches to each single frame—by way of identifying the videos returned consistently and repeatedly as results for most of the query frames. There will with a very large chance be false positive matches for any particular single frame (see the analysis for false positive above).
  a. Per each query frame the system can find a match to the correct corresponding ground-truth frame with a probability of 0.965, as well as false-positive matches to a small collection of other different frames.
  b. The larger the corpus of signatures being matched to is (being searched over) the larger is the chance to match any given query signature to false positive frames as well.
    i. In a corpus of about 50 million such signatures, coming from 5000 different videos (randomly picked) experiments demonstrate the chances of hitting direct duplicates to any query signature are about 70%.
    ii. It may be theoretically and readily calculated, under the assumptions that the signatures distribute in their values about randomly how likely are repetitive identical signatures to appear within a particular signature corpus size. Calculations agree with the experimental results described above.
9. All numbers involved are completely free parameters (64 regions, 128 bits, 5 bit sets, 16 such 5-bit sets and 20 repetitions) and are subject to the overall and different size of the frame corpus (and its various chunks); to be tuned accordingly. Similar indexing methods arranging the entire corpus of bit signatures by the values of various particular pre-determined sub-sets of bits can also be employed.

D. Video ID Audio Signatures and Indexing

1. Original Representation of Recorded Audio Signals

Audio recorded from a microphone is often represented using the pulse-code modulation format, comprising a sequence of audio signal amplitude samples at equally spaced time intervals. These discrete samples approximate the actual continuous-time audio signal generated by physical phenomena and are often represented using signed integers or floating point numbers that lie in a particular range, e.g. [−32768, 32767]. The Nyquist sampling theorem in the signal processing literature indicates that the temporal spacing of the samples determines the highest possible frequency contained in the discrete signal, and that to represent a signal with maximum frequency of N hertz, 2*N samples per second are required. Because humans typically cannot hear frequencies above 20,000 Hz, a common choice of samples per second is 44,100 audio samples/second, which allows for audio signal frequencies of up to 22,050 Hz, more than enough for human hearing.

2. Frequency-Domain Representation of the Signal—an Alternative to the Time-Domain The well-known theory of Fourier analysis indicates that the audio signal samples can be viewed not just as a sequence of samples in time, but as a composition of canonical sinusoidal waveforms each corresponding to a different audio frequency. The original audio signal, in its discrete or continuous form, can be well approximated using a linear combination of a finite number of these waveforms.

3. a More Compact Representation of the Signal Via the Frequency-Domain

The audio signal can therefore be represented compactly as the linear coefficients of these waveforms, as well as the original samples, often referred to as the frequency domain, versus the original time domain representation. The process of converting a time-domain (audio) signal into a frequency-domain set of coefficients is often referred to as the Fourier transform. Specialized algorithms for the Fourier transform have been developed for discretely-sampled signals (which is the usual representation for audio), allowing for very efficient computation of the Fourier transform from the time-domain signal.

Because the total number of audio samples tends to be much larger than the number of coefficients required to represent the signal, the Fourier transform can effectively compress the signal dramatically while still retaining nearly all of the original signal information. Furthermore, it reveals the frequency content of the signal (in terms of power in each frequency component), useful information for matching of audio signals. The concise and descriptive nature of the frequency-domain representation makes it suitable for processing audio signals for the purposes of search and retrieval.

4. Local Frequency Analysis: the Spectrogram

While the complete audio signal can be represented with a single set of frequency-domain coefficients, it can be advantageous to compute such coefficients for local temporal neighborhoods of the signal in order to support common search tasks such as matching only a subset of the original audio signal (important in cases where the query audio signal can be partially corrupted), or fast lookup of possible matches for an audio signal based on a smaller descriptor. For many possible subsets or windows of the audio signal (a smaller number of temporally consecutive audio samples), the Fourier transform components can be computed using a weighting over the samples in the window emphasizing samples near the center and discounting those further away. These windows may be overlapping to avoid large fluctuations in the values between time steps. As depicted in FIG. 2, the result of this procedure is a snapshot of the local frequency content at regular time intervals, often called a spectrogram (block 300). As an example, the Fourier transform can be applied windows of the 256 samples in an audio signal with 44,100 samples/second where each window overlaps in 128 samples, producing one spectrogram approximately every 3 milliseconds.

Generally speaking, a spectrogram for a particular audio signal can be viewed as a function S: T×F→R, where T is a particular moment in time, F is a particular frequency band, and the result of the function is a real-valued number representing the power in frequency band F at time T. Note that the spectrogram can be viewed as a two-dimensional function, similar to an intensity image in computer vision. Intuitively, similar techniques used for indexing images can be applied to spectrograms, treating each one simply as an image.

5. Spectrogram to Descriptor

Given a spectrogram, the system can blur and subsample the spectrogram to remove redundant information and noise, leaving the system with a reduced spectrogram suitable for computing bit-wise descriptors. The descriptors represent the change in energy content in a particular frequency band between two consecutive time steps (block 310). If the amount of energy increased, the system can assign a bit as 1 and 0 otherwise. The system can also record the difference in energy that gave rise to the bit as additional information about the confidence of the bit. With this procedure, the system can transform a spectrogram with continuous values representing the power in different frequency bands at various time steps into a binary descriptor augmented by bit confidence information. Such a binary descriptor, comprised of ordinal statistics, has many useful properties, including being invariant to overall scaling of the spectrogram or adding a constant value to the energy levels.

6. Fast Descriptor Search and Verification

For audio content to be searched (block 320), the above binary descriptors can be computed very efficiently (at least an order of magnitude faster than real-time), cut into constant-size pieces (such as 128-bit chunks), and stored in computer (e.g., in RAM). Specifically, the procedure of locality sensitive hashing can be used to efficiently find possible good matches for a query descriptor (computed from a user-generated video file, for example). Given a possible correspondence of the query descriptor to the corpus, additional bits in the temporal neighborhood of the match of both the query and corpus descriptors can be examined to determine if this in fact a correct match. Additionally, some bits in certain frequency bands or with high bit difference tend to be better indicators of a correct match or not. These bits can be further emphasized by computing on a test corpus the probability P (descriptor bit i matched I the query-corpus match is correct), or P_i. Bits with high P_i that match can lend a higher boost to the verification score than bits with low P_i or that don't match. The value P_i can also depend on the bit difference associated with bit i, computed from the spectrogram. The P_i values can also be used to determine the best parameters for spectrogram blurring/subsampling; the goal is to have bits that are as discriminative as possible, and searching over multiple blurring/subsampling schemes, the system can discover which scheme provides bits with the best P_i.

7. Computing Query Descriptors on a Cellphone

In some embodiments, the system can take a user-generated video clip, extracting descriptors from the audio, and searching against the corpus. This can involve transmission of the audio signal from the phone to the servers that search the database. However, the amount of information transferred can be significantly reduced by computing descriptors for the audio directly on the phone, and transmitting only these descriptors instead of the entire audio signal. Because the descriptor computation involves substantial subsampling of the audio spectrogram, the size of descriptors for a query is much smaller than the original audio signal, typically by an order of magnitude. Similarly, in the embodiment described in section C, video captured by a user's can be either processed by the phone itself or transmitted to the server for processing.

Figure 4:
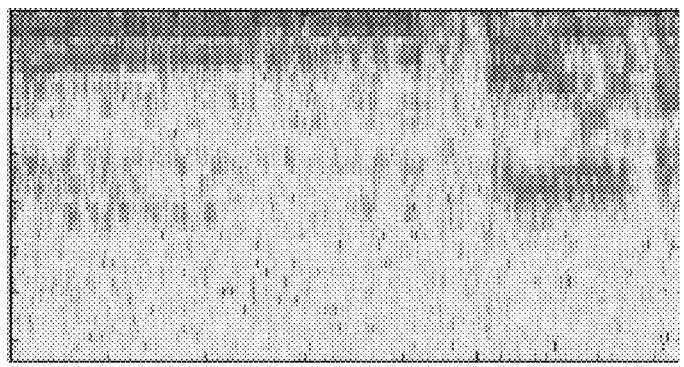
FIG. 4 illustrates an example of a spectrogram of an audio signal in accordance with one embodiment.
Figure 5:
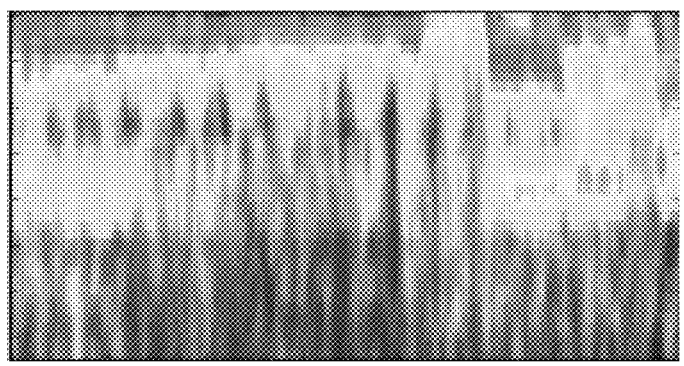
FIG. 5 illustrates an example of a spectrogram after blurring in accordance with one embodiment.
Figure 6:
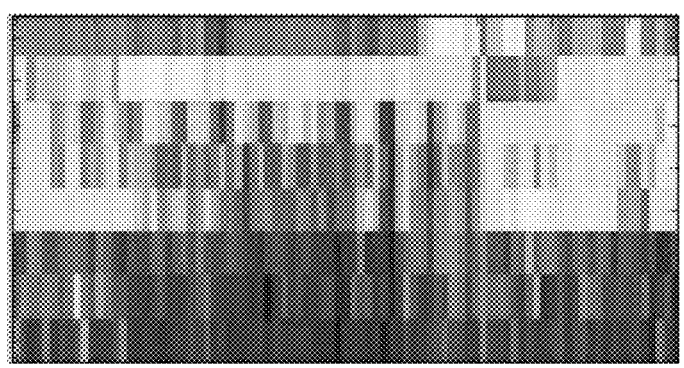
FIG. 6 illustrates an example of a spectrogram after blurring and subsampling in accordance with one embodiment.
Figure 7:
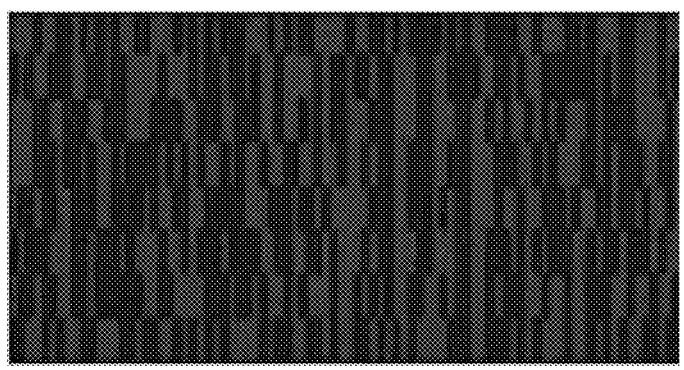
FIG. 7 illustrates an example of a binary descriptor computed from a spectrogram in accordance with one embodiment.

FIG. 4 depicts an example of a spectrogram of an 4-second audio signal. FIG. 5 depicts an example of the spectrogram after blurring. FIG. 6 depicts an example of the spectrogram after blurring and subsampling. FIG. 7 depicts an example of a binary descriptor computed by comparing neighboring values from the spectrogram after blurring and subsampling. the lighter elements indicates a bit with value 1 and the darker elements indicates a bit with value 0. Bit difference information can be obtained from spectrogram after blurring and subsampling.

Figure 8:
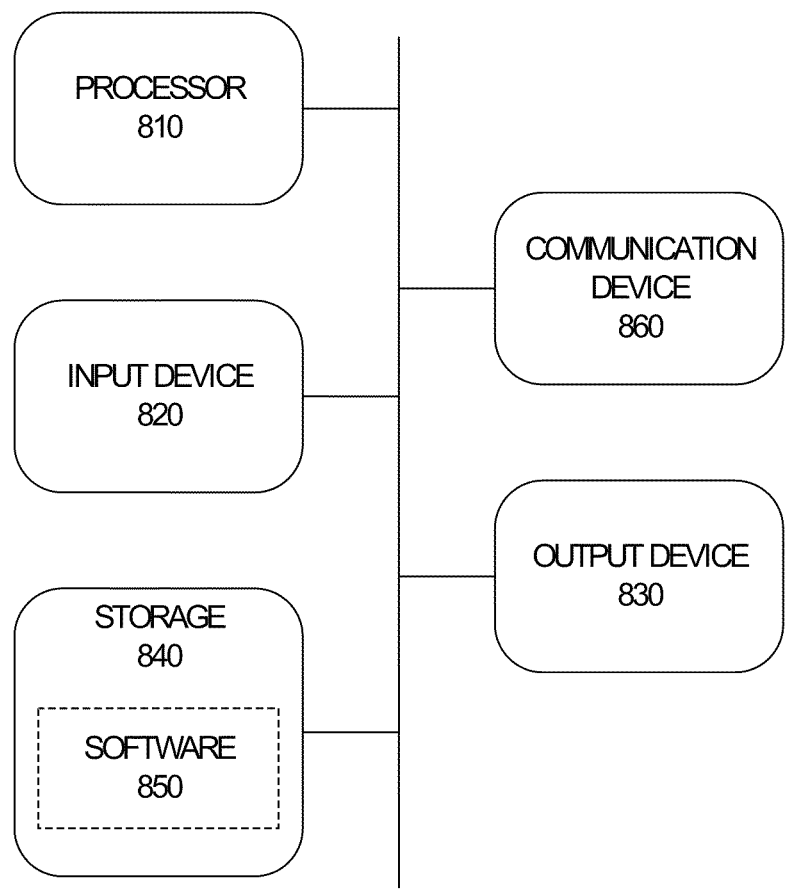
FIG. 8 illustrates an example of a computing device in accordance with one embodiment.

FIG. 8 illustrates an example of a computing device in accordance with one embodiment. In the embodiment illustrated in FIG. 8, the computing device may generally correspond to the device that captures (e.g. records) the video or audio as described above and the server that processes (e.g., indexing, searching) the video and/or audio as described above. The computing device may be any suitable type of microprocessor-based device, such as, for example, a handheld computing device such as a phone or tablet, a personal computer, workstation, or server. The computing device may include, for example, one or more of processor 810, input device 820, output device 830, storage 840, and communication device 860.

Input device 820 may be any suitable device that provides input, such as, for example, a touch screen or monitor, keyboard, mouse, or voice-recognition device. Output device 830 may be any suitable device that provides output, such as, for example, a touch screen, monitor, printer, disk drive, or speaker.

Storage 840 may be any suitable device the provides storage, such as, for example, an electrical, magnetic or optical memory including a RAM, cache, hard drive, CD-ROM drive, tape drive or removable storage disk. Communication device 860 may include any suitable device capable of transmitting and receiving signals over a network, such as, for example, a network interface chip or card. The components of the computing device may be connected in any suitable manner, such as, for example, via a physical bus or wirelessly.

Software 850, which may be stored in storage 840 and executed by processor 810, may include, for example, the application programming that embodies the functionality of the present disclosure as described above. In some embodiments, software 850 may include a combination of servers such as application servers and database servers, and may be split across devices.

Software 850 can also be stored and/or transported within any non-transitory computer-readable storage medium for use by or in connection with an instruction execution system, apparatus, or device, that can fetch instructions associated with the software from the instruction execution system, apparatus, or device and execute the instructions. In the context of this document, a computer-readable storage medium can be any non-transitory medium, such as storage 840, that can contain or store programming for use by or in connection with an instruction execution system, apparatus, or device.

Software 850 can also be propagated within any transport medium for use by or in connection with an instruction execution system, apparatus, or device that can fetch instructions associated with the software from the instruction execution system, apparatus, or device and execute the instructions. In the context of this document, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

The computing device can also be connected to other computing devices over a network, which may include any suitable type of interconnected communication system. The network may implement any suitable communications protocol and may be secured by any suitable security protocol. The network can include network links of any suitable arrangement that implements the transmission and reception of network signals, such as, for example, wireless network connections, T1 or T3 lines, cable networks, DSL, or telephone lines.

The computing device may implement any suitable operating system, such as, for example, iOS® provided by Apple Inc. in connection a mobile computing device for capturing video and/or audio as described above and UNIX in connection with the server that indexes and searches as described above. Software 850 may be written in any suitable programming language, such as, for example, C, C++ or Java. In various embodiments, application software embodying the functionality of the present disclosure may be deployed in different configurations, such as, for example, in a client/server arrangement or through a Web browser as a Web-based application or Web service, for example.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units may be seen as references to suitable means for providing the described functionality rather than indicative of a strict logical or physical structure or organization.

The disclosure may be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments can be used, while still employing the same basic underlying mechanisms and methodologies. For example, although the embodiments described herein focus on the capture of video and/or audio to search video, any suitable type of content can be used to search for any suitable type of content in accordance with the teachings described herein. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method, comprising:
   receiving, by a computing device, content comprising a media clip including audio and video;
   analyzing, by the computing device, at least a portion of the content, said analyzing including preparing query frames of the content by selecting representative frames in the content and selecting at least one of the audio and video in the content to generate a signature for a search query;
   generating, by the computing device, the signature, the signature including a set of bits identifying the content, wherein the set of bits are determined from a plurality of regions of a video frame of the representative frames in the content, a bit of the set of bits associated with a region of the plurality of regions, the bit being assigned a first value if a predetermined half of the region is brighter than the other half of the region, and the bit being assigned a second value if the predetermined half of the region is not brighter than the other half of the region; and
   receiving video search results resulting from a comparison of the generated signature in a search query against a search corpus to identify the media clip in the search corpus.

2. The method of claim 1, wherein the receiving by the computing device occurs while the media clip is playing on a different device.

3. The method of claim 1, wherein the content is video and the analyzing including detecting an active play screen area by analyzing intensity edges of the at least a portion of the content.

4. The method of claim 1, wherein the comparison includes randomly selecting multiple collections of a fixed number of bits and comparing the multiple collections against a search corpus.

5. The method of claim 1, wherein the predetermined half of the region is a right half or a left half of the region.

6. The method of claim 1, wherein the predetermined half of the region is a top half or a bottom half of the region.

7. The method of claim 1, wherein the at least a portion of the content is a spectrogram of the audio.

8. The method of claim 7, wherein the analyzing further includes creating a signature from audio in the at least a portion of the content, each bit therein being associated with a change in energy in a frequency band of the spectrogram.

9. The method of claim 8, wherein each bit is assigned a first value if the change in energy represents an increase in energy, and each bit is assigned a second value if the change in energy represents a decrease in energy.

10. A computer-readable storage device embodied with instructions to cause, when executed, a computing device to:
    receive content comprising a query frame including video content and audio content;
    analyze the query frame;
    generate a signature of the video content of the query frame wherein each bit of the signature is associated with a brightness of a region of the frame and each bit is assigned a first value if a predetermined half of the region is brighter than the other half of the region, and each bit is assigned a second value if the predetermined half of the region is not brighter than the other half of the region; and
    use the signature of the audio content and the signature of the video content in a search query including randomly selecting multiple collections of a sub-set of bits in the signature of the video content and comparing the multiple collections against a search corpus.

11. A method comprising:
    receiving, by a first computing device from a second computing device, a signature of a portion of a media clip, the signature representing a recording of a video playing on a screen of a different device which is captured by the second computing device, the signature generated from selected query frames of either or both of audio content or video content in the media clip;
    using, by a first computing device, the signature in a search query by comparing the signature against a search corpus to reduce a set of result candidates for the search query the comparing including a coarse direct comparison of the signature to ground truth signatures and, if needed, a second comparison to an index of the search corpus, the comparing to identify the video playing on the screen of the different device; and
    outputting results of the search query from the first computing device to the second computing device.

12. A method of claim 11, wherein the search query matches the signature to a corpus of ground truth signatures specifying an identity of the selected query frames as a video.

13. A method of claim 11, wherein the query frame is created by determining boundaries of the screen by looking for lines that have an intensity variance indicating one or more of the lines is not dark along an inward edge relative to the screen and an intensity variance indicating the one or more lines are dark along an external edge relative to the screen.

14. A method of claim 13, wherein the determining of the boundaries includes filtering out lines that cut through a continuous object.

15. A method of claim 13, wherein the determining of the boundaries includes selecting lines located within the video.

16. A computing device comprising a processor configured to:
    receive a recording of a video playing on a screen of a different device, the recording including a video portion and an audio portion;
    determine boundaries of the screen in video portion of the recording by determining lines that have an intensity variance indicating one or more of the lines is not dark along an inward edge relative to the screen and an intensity variance indicating the one or more lines are dark along an external edge relative to the screen;

extract the video within the determined boundaries from the recording;

extract the audio portion from the recording;

generate a signature for the audio portion and a bit wise signature for the video portion and use the signatures in one or more search queries to identify the recording.

17. A method comprising:

receiving a recording of a video playing on a screen of a different device, the recording including a video portion and an audio portion;

determining boundaries of the screen in the video portion of the recording, the determining of the boundaries includes looking for lines that have an intensity variance indicating one or more of the lines is not dark along an inward edge relative to the screen and an intensity variance indicating the one or more lines are dark along an external edge relative to the screen; and extracting the video within the determined boundaries from the recording;

extracting the audio portion from the recording;

generating a signature for the extracted audio portion and a bit wise signature for the extracted video portion and using the extracted video in a search query identify the content as part of a broadcast media content.

* * * * *